June 13, 1950 A. CROT 2,511,495
UNIVERSAL AND SLIP JOINT
Filed Sept. 6, 1943
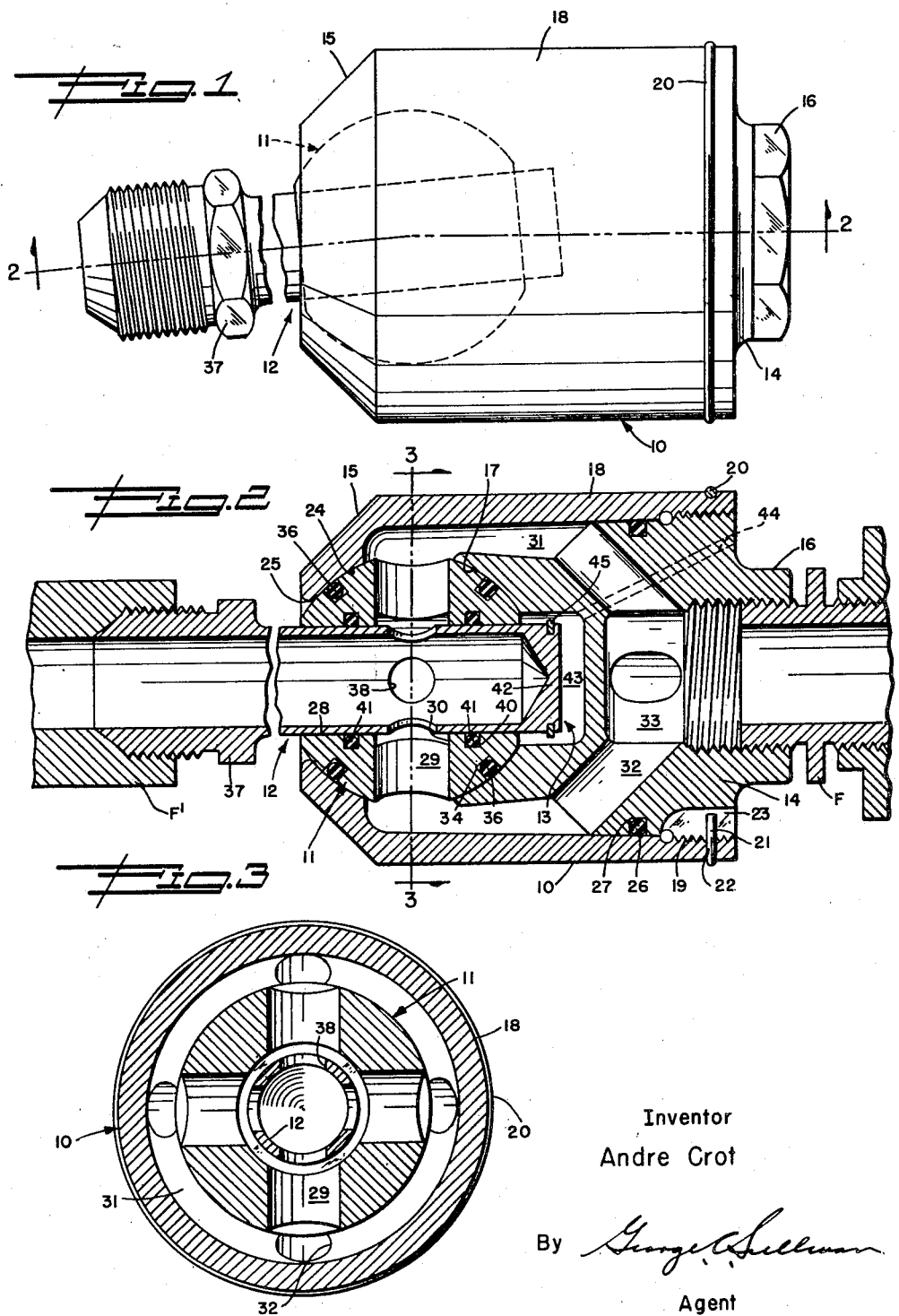
Inventor
Andre Crot
By George A. Sullivan
Agent Patented June 13, 1950

2,511,495

UNITED STATES PATENT OFFICE 2,511,495

UNIVERSAL AND SLIP JOINT

André Crot, North Hollywood, Calif., assignor to Lockheed Aircraft Corporation, Burbank, Calif.

Application September 6, 1943, Serial No. 501,354

13 Claims. (Cl. 285—11)

This invention relates to couplings and joints, and relates more particularly to universal and slip joints for use in pipe lines, conduits, systems, etc., handling fluid pressure.

A general object of this invention is to provide a simple, practical and very effective combination universal and slip joint.

Swivel joints, slip joints and universal joints are frequently required in pipe lines, conduits and systems conducting or containing fluid under pressure. Where the fluid is under substantial pressures it is difficult to maintain effective fluid-tight seals between the relatively movable joint parts, and the unbalanced fluid pressures cause excessive friction between the parts. The excessive friction and resultant resistance to relative movement of the joint parts are due primarily to the unbalanced imposition of the fluid pressures on the joint parts, and so far as I am aware, no universal joint or slip joint has been introduced in which the fluid pressures are balanced to allow substantially unrestrained relative movement of the joint parts.

It is an important object of the present invention to provide a fluid conducting universal and slip joint in which the fluid pressures exerted on the relatively movable parts of the joint are balanced to allow relative movement of the parts with a minimum of friction, resistance and distortion.

Another object of the invention is to provide a balanced fluid conducting joint adapted to connect two elements of a line, conduit system, or mechanism, for relative universal or angular movement, for relative rotation and for relative axial movement.

Another object of the invention is to provide a joint of the character referred to in which the relative axial movement between the joint parts operates to cool the joint.

Another object of the invention is to provide a combination universal and slip joint in which the fluid pressures on both the ball member and the axially movable member are balanced so that the ball may move freely in its socket and the slip member is free to move in the ball with a minimum of friction, there being no tendency for the fluid pressures to either separate the relatively movable parts or to force them into movement resisting engagement.

Another object of the invention is to provide a joint of the character referred to in which the sealing or packing means are subjected to a minimum of wear and distortion and are therefore very long lived.

Other objects and features of the invention will be readily understood from the following detailed description of typical preferred forms of the invention throughout which reference will be made to the accompanying drawings in which:

Figure 1 is a plan view of a joint embodying the features of this invention.

Figure 2 is a central longitudinal detailed sectional view of the invention taken on the line 2—2 of Figure 1.

Figure 3 is a transverse detailed sectional view taken as indicated by line 3—3 on Figure 2.

The illustrated joint may be said to comprise generally a socket 10, a movable ball 11 in the socket 10, an axially movable member 12 engaged in the ball 11 and means 13 for balancing the fluid pressures on the member 12.

The socket 10 is adapted to be secured to one of the fluid handling parts of the line, conduit or system, to be rigid therewith. The socket 10 is preferably sectional comprising two parts or sections 14 and 15. The section 14 may be constructed for ready attachment to a conduit, fitting or the like. In the particular case illustrated, the section 14 has an internally screw threaded boss 16 for receiving a fitting F, a pipe or similar member. The periphery of the section 14 is preferably cylindrical and the inner end of the section is shaped to partially receive the ball 11. A spherically concaved surface 17 is provided on the inner end of the section 14. The axis of curvature of the surface 17 preferably lies in the longitudinal axis of the socket 10 and section 14.

The section 15 of the socket 10 is in the nature of a cap or cup having a tubular side wall 18 which fits around the section 14. The end portion of the wall 18 and the section 14 have mating screw threads 19 which connect the sections 14 and 15. A lock wire 20 is engaged in an annular groove in the exterior of the wall 18 and has an inturned finger 21 extending inwardly through a radial opening 22 in the wall 18. The finger 21 cooperates with a notch 23 in the section 14 to lock the sections 14 and 15 against relative turning. There may be circumferentially spaced openings 22 and/or notches 23 so that the lock finger 21 may serve to lock the sections 14 and 15 against relative turning when in the correct threaded-together positions. Means is provided for preventing the leakage of fluid from between the sections 14 and 15. This means may comprise an elastic annular sealing ring 26 arranged in an annular groove 27 in the periphery of the section 14 to seal with the internal surface of the wall 18. The outer or end wall of the cuplike section 15 is provided with a spherically curved concave internal surface 24. The axis of curvature of the surface 24 is coincident with the axis of curvature of the surface 17. The spherically concaved surfaces 17 and 24 are accurately formed and carefully finished. A central opening 25 is provided in the outer wall or end wall of the section 15 to expose a portion of the ball 11 for the reception of the member 12. The opening 25 is preferably, though not necessarily, in longitudinal alignment with the opening of the tubular boss 16 on the section 14.

The ball 11 is a generally spherical element contained within the socket 10. In practice the ball 11 may be a one-piece or integral element. The spherical surface of the ball 11 conforms to the spherically concaved surfaces 17 and 24 of the socket 10 and is accurately formed and finished. A diametric opening 28 extends completely through the ball 11 to receive the member 12. The opening 28 is somewhat smaller in diameter than the opening 25 in the end of the socket 10 and when the ball is in its neutral or central position the opening 28 is concentric with the opening 25 and the longitudinal axis of the joint.

A port system is provided in the socket 10 and ball 11 to conduct the fluid pressure between the member 12 and the boss 16 or fluid handling element F associated therewith. Equally spaced radial ports 29 are provided in the ball 11. An annular groove 30 is provided in the wall of the diametric opening 28 and the radial ports 29 extend outwardly from this groove to the surface of the ball. The ports 29 preferably have their longitudinal axes normal to the longitudinal axis of the diametric opening 28. It is preferred to make the ports 29 of substantial capacity. The internal surface of the socket wall 18 has a diameter considerably greater than the diameter of the ball 11 and the inner portion of the socket section 14 is reduced in external diameter leaving an annular chamber or passage 31. This passage 31 surrounds that portion of the ball 11 which occurs between the spaced opposite socket surfaces 17 and 24. The outer ends of the ports 29 of the ball 11 communicate with the annular passage 31 in all positions of the ball. Circumferentially spaced ports 32 extend through the socket section 14 from the annular passage 31 to a space or chamber 33. The chamber 33 joins the opening in the tubular boss 16 to be in full communication with the interior of the conduit or fitting F with which the boss 16 is associated. The aggregate capacity of the ports 32 is preferably equal to or greater than the fluid capacity of the member 12.

Means are provided to maintain fluid-tight and pressure-tight seals between the ball 11 and the socket 10 at opposite sides of the series of radial ports 29 to prevent the leakage of fluid from between the ball and socket. Annular grooves 34 are provided in the ball 11 and are spaced at opposite sides of the series of radial ports 29. Sealing rings 36 are arranged in the grooves 34 to engage and seal with the surfaces 17 and 24. The sealing rings 36 may be continuous annular parts of rubber, synthetic rubber or other flexible resilient packing material of cylindrical cross section and having a diameter slightly greater than the depth of the grooves. This type of sealing or packing ring has proven to be highly satisfactory in preventing the leakage of fluid under pressure.

The member 12 is adapted to be connected with a conduit section, fitting or other part of the fluid handling system. The member 12 is an elongate tubular element and its outer portion may be formed for ready connection with a fitting, conduit section or the like. In the case illustrated, the member 12 has an enlargement 37 on its outer end, flanged and provided with an external screw thread to facilitate the connection of the member with a fitting F¹, or the like. The member 12 is slidably and turnably received in the opening 28 of the ball 11. In accordance with the invention, the member 12 is proportioned to extend completely through the opening 28 and may project any selected or required distance outwardly from the joint. The longitudinal opening of the member 12 is maintained in communication with the above described port system. A series of circumferentially spaced ports 38 is provided in the wall of the member 12 to communicate with the annular groove 30 in the interior of the ball 11. The groove 30 maintains the ports 38 in communication with the ports 29 in all possible positions of the member 12. The groove 30 is preferably of substantial width so that relative axial movement between the ball 11 and the member 12 does not move the ports 38 out of full communication with the groove. The invention provides means for sealing between the ball 11 and the member 12 at opposite sides of the groove 30. Annular grooves 40 are provided in the wall of the opening 28 and sealing rings 41 similar to the above described rings 36 are arranged in the groove 40 to seal with the external surface of the member 12.

The means 13 serves to balance the hydraulic pressures or fluid pressures on the member 12, and is such that the axial fluid pressures do not tend to force either the member 12 or the ball 11 either outwardly or inwardly. In ordinary ball and socket joints, the axial or end fluid pressures tend to force the ball and socket members apart with the result that the packing is subjected to distortion and excessive wear, and the surfaces of the ball and socket members are forced together to offer substantial resistance to relative movement of the members. The pressure balancing means of the invention eliminates or avoids the unbalanced pressure conditions existing in the ordinary ball and socket joints.

The means 13 includes a head or wall 42 closing the inner end of the tubular member 12. The wall 42 is imperforate, serving to completely close or seal the inner end of the tubular member 12. In practice the wall 42 may be integral with the member 12. The internal surface of the partition or wall 12 is, of course, exposed to the fluid pressure within the member 12. In accordance with the invention, the outer surface of the wall 42 is entirely relieved of fluid pressure and is acted upon only by atmospheric pressure. With the outer surface of the wall 42 acted on only by atmospheric pressure, the fluid pressure exerted on the inner surface of the wall 12 equals and balances out the fluid pressure acting on the corresponding and opposing area of the line, fitting, container, pump or other element with which the member 12 communicates. Thus, the member 12 is hydraulically balanced.

It is a feature of the invention that the hydraulic balancing of the member 12 is accomplished without subjecting the ball 11 to unbalanced fluid pressures. The pressure balancing means 13 includes or provides an atmospheric pressure chamber 43 in the socket 10 for receiving the closed end portion of the member 12 so that the outer surface of the wall 42 is exposed to atmospheric pressure. The chamber 43 is formed in the socket section 14, being in the nature of a central socket or cylinder extending outwardly or rearwardly from the spherical surface 17. The chamber 43 is larger in diameter than the member 12 and has a depth equal to or greater than the intended maximum stroke of the member. A port 44 extends from the exterior of the section 14 to the chamber 43 to maintain the chamber in communication with the atmosphere. The port 44 is of substantial capacity to prevent the development of super-atmospheric pressures and negative pressures in the chamber 43 when the relative movement of the joint parts results in a ram-like or piston-like motion of the member 12 in the chamber 43. If desired, means may be provided to limit the relative outward movement of the member 12 to prevent displacement of the member and to prevent the ports 38 from moving out of communication with the groove 30. As illustrated, this means comprises a ring 45 set in a groove in the inner end portion of the member 12 and projecting from the outer surface of the member. The ring 45 is engageable with the end wall of the chamber 43 to limit the outward travel of the member.

It is to be observed that the pressure balancing means 13 just described is extremely simple and does not necessitate the employment of moving or wearing parts. It is to be observed further that the simple arrangement of the ports 29, passage 31 and ports 32 effectively by-passes the fluid flow past, or around the pressure equalizing chamber 43, without requiring the employment of additional parts in the joint.

It is believed that the operation of the embodiment of the invention illustrated in Figures 1 and 2 will be readily understood from the foregoing detailed description. The ball 11 is free to turn and have universal angular motion with respect to the socket 10. The member 12 is adapted to have free axial movement and rotary movement. These relative motions are unrestrained by the fluid pressures and the joint is designed so that there is a minimum of frictional resistance to such motions. As described in detail above, the hydraulic end pressures or axial pressures on the member 12 are balanced so that these pressures do not tend to resist relative movement between the member 12 and the ball 11, or to blow the member out of the ball. The balancing of the end pressures on the member 12 is accomplished without unbalancing the ball 11 and the ball 11 remains free of end thrusts or end pressures and is therefore free to move in the socket 10 regardless of the working pressure imposed on the fluid, whether flowing therethrough or static, and whether the joint is subjected to longitudinal or traverse vibrations. Where there is relative axial movement between the parts, the closed end of the member 12 operating in the chamber has a pumping action, serving to pump air into and out of the chamber 43 to cool the joint. The joint of Figures 1 and 2 is well suited for use where high pressures and substantial vibration are to be encountered, but is not limited to such applications.

From the foregoing detailed description it will be apparent that the invention provides universal slip joints suitable for use in lines, systems and mechanisms handling fluid pressures or handling negative or reduced pressures. The joint elements are hydraulically balanced relieving the packing and other parts of distortion and greatly reducing the frictional resistance to relative movement of the joint parts. The joints are well adapted for use in situations where there is serious vibration and where there is the necessity for relative movement between the fluid handling elements of the system. The joint is extremely simple requiring a minimum number of parts.

Having described only a typical form of the invention, I do not wish to be limited to the specific details herein set forth, but wish to reserve to myself any variations or modifications that may appear to those skilled in the art or fall within the scope of the following claims.

I claim as my invention:

1. A fluid conducting joint adapted to be connected between two fluid handling elements, the joint comprising a socket unit, a ball unit, said units being related for relative universal movement, a tubular member carried by one of said units for relative axial movement, means on the member for facilitating its connection with one of said fluid handling elements, means on one of said units for facilitating its connection with the other fluid handling element, and means for balancing the axial fluid pressures on said member comprising walls in said unit defining a space open to the atmosphere and adapted to receive an end portion of the tubular member, and a wall closing said end portion of the tubular member and having one side acted on by the fluid pressure in the member and one side acted on by the atmospheric pressure in said space, said member having a lateral opening and said units having a fluid passage extending from said opening to said other fluid handling element in by-passing relation to said space.

2. A fluid conducting joint including a socket unit, a ball unit in the socket unit, the two units being related for relative universal movement, a tubular fluid conducting member associated with one of said units for relative axial movement, the units having a fluid passage communicating with said member, and means for separately balancing the fluid pressures on the member and ball unit.

3. A fluid conducting joint including a socket unit, a ball unit in the socket unit, the two units being related for relative universal movement, a tubular fluid conducting member associated with one of said units for relative axial movement, the units having a radial fluid passage communicating with said member, the axially directed fluid pressures on the ball being substantially equalized.

4. A fluid handling joint including a socket unit, a ball unit arranged in the socket unit for relative universal movement, means on one unit for facilitating its connection with a fluid handling element, a tubular member carried by one of said units for relative axial movement, means on the member for facilitating its connection with a fluid handling element, the said units having a passage leading from the tubular member to the first named unit, said passage subjecting substantially equal and opposite portions of the ball to the pressure existing in said member, whereby to balance the pressures acting thereon.

5. A fluid conducting joint adapted to be connected between two fluid handling elements, the joint comprising a socket unit, a ball unit, said units being related for relative universal movement, a tubular member carried by one of said units for relative axial movement, means on the member for facilitating its connection with one of said fluid handling elements, means on one of said units for facilitating its connection with the other fluid handling unit, means for balancing the axial fluid pressures on said ball unit and member comprising a plurality of sealing means coacting between the ball unit and the socket unit and dividing the surface of the ball into equal and oppositely disposed zones normal to the axis of the joint, and walls in said unit defining a space open to the atmosphere and to one of said ball unit zones and adapted to receive an end portion of the tubular member, and a wall closing said end portion of the tubular member and having one side acted on by the fluid pressure in the member and one side acted on by the atmospheric pressure in said space.

6. A fitting comprising in combination a ball having an internal chamber an external spherical surface, a central cylindrical bore traversing said chamber and a fluid passage from said chamber to the exterior of said ball at substantially right angles to said bore, a male member having a smooth cylindrical exterior disposed in said bore and longitudinally movable therein and having a fluid passage from one end thereof communicating with said chamber in said ball, the other end of said member lying in said bore at least beyond said chamber, a female member having socket parts with spherical surfaces engaging the spherical surface of said ball on spaced areas and exposing the exterior of said ball adjacent said transverse passage, one of said socket parts having an opening through which said male member extends beyond said bore and within which said male member may swing about the center of said ball, the other of said socket parts having an opening permitting communication with atmosphere of the opposite side of said ball, fluid sealing means on opposite sides of said internal chamber between said male member and said bore, and fluid sealing means between said socket parts and the adjacent spherical surfaces of said ball.

7. A fitting comprising in combination a ball having an external spherical surface, a central cylindrical bore intersecting said surface on opposite sides, and a fluid passage from said bore to the exterior of said ball at substantially right angles to said bore, a male member having a smooth cylindrical exterior disposed in said bore and longitudinally movable therein and having a fluid passage from one end thereof communicating with said passage, the other end of said member lying in said bore beyond said passage, a female member having parts with spherical surfaces engaging the surface of said ball on spaced areas lying transversely of said bore and exposing the exterior of said ball in the annular zone of said transverse passage, one of said parts having an opening through which said one end of said male member extends and within which said male member may swing and rotate about the center of said ball, the other of said parts having an opening permitting the communication to atmosphere with the other end of said male member and the surface of said bore adjacent the other end of said bore, fluid sealing means on opposite sides of said passage between said male member and said bore, and fluid sealing means between said parts and the adjacent surfaces of said ball, said female member having a fluid passage from the exterior thereof to the space between said areas.

8. A fluid conducting joint adapted to be connected between two fluid handling elements, the joint comprising a socket unit and a ball unit, said units being related for relative universal movement, a tubular member carried by one of said units for relative axial movement, means on the member for facilitating its connection with one of said fluid handling elements, means on one of said units for facilitating its connection with the other fluid handling unit, and means for separately balancing the axial fluid pressures acting on said ball unit and said member, comprising isolated areas balanced against each other and oppositely disposed relative to a transverse plane through the ball unit and subjected to the internal fluid pressures in said joint, means sealing the inner end of said tubular member, and means exposing the exterior surface of said sealed inner end to atmospheric pressure.

9. A fitting comprising in combination a female member having spaced socket parts associated therewith, a male member having a ball part associated therewith movably supported in said socket parts, said male member being supported in said ball part with freedom of at least limited longitudinal movement therein, sealing means disposed between said socket parts and said ball part, said female member having a passage for fluid under pressure leading to and around said ball part in a space between said socket parts, said male member having a passage for fluid under pressure leading through said ball part to said space, both said socket parts affording communication to equal external or atmospheric pressures externally of said sealing means.

10. The combination of claim 9 in which said male member is rotatively and slidably engaged in said ball part.

11. The combination of claim 9 in which said male member is rotatively and slidably supported in said ball part and both ends of said male member are exposed to equal external or atmospheric pressures.

12. A swivel fitting comprising a ball having a central bore extending therethrough and a passage extending from and transversely of said bore, a male member disposed in said bore extending therein beyond the intersections thereof with said passage, said male member having a fluid passage from one end thereof communicating with said passage, a female member supporting said ball exteriorly upon spaced areas coaxially of said bore and having a fluid passage leading from the exterior of said ball between said areas and communicating with the said passage in said ball, the female member admitting movement of said ball and male member therein, and said female member having openings to atmosphere communicating with said ball on opposite sides without said areas.

13. The combination of claim 12 with means for limiting longitudinal movement of said male member in said bore.

ANDRÉ CROT.

REFERENCES CITED

The following references are of record in the file of this patent:

UNITED STATES PATENTS

| Number | Name | Date |
| --- | --- | --- |
| 825,220 | Irvin | July 3, 1906 |
| 1,985,012 | Boehm | Dec. 18, 1934 |

FOREIGN PATENTS

| Number | Country | Date |
| --- | --- | --- |
| 2,007 | Great Britain | Jan. 28, 1896 |